United States Patent [19]

Horn

[11] Patent Number: 5,709,431

[45] Date of Patent: Jan. 20, 1998

[54] SEAT COVER FOR PROTECTING A MOTOR VEHICLE SEAT

[75] Inventor: Stephanie Horn, Schwalmstadt, Germany

[73] Assignee: Horn & Bauer GmbH & Co. KG, Schwalmstadt, Germany

[21] Appl. No.: 693,394

[22] Filed: Aug. 7, 1996

[30] Foreign Application Priority Data

Sep. 28, 1995 [DE] Germany .................. 195 36 0621

[51] Int. Cl.⁶ .................................................. A47C 31/00
[52] U.S. Cl. .................. 297/228.1; 297/229; 297/219.1
[58] Field of Search .................. 297/219.1, 218.1, 297/228.1, 229

[56] References Cited

U.S. PATENT DOCUMENTS

| | | | |
|---|---|---|---|
| 3,695,692 | 10/1972 | Williams | 297/229 |
| 4,361,628 | 11/1982 | Krueger et al. | 428/475.8 |
| 4,588,648 | 5/1986 | Krueger et al. | 428/475.8 |
| 4,676,376 | 6/1987 | Keiswetter . | |
| 4,884,839 | 12/1989 | Keiswetter | 297/219.1 |

FOREIGN PATENT DOCUMENTS

| | | | |
|---|---|---|---|
| 634125 | 1/1995 | European Pat. Off. | 297/229 |
| 3419728 | 11/1985 | Germany | 397/229 |

*Primary Examiner*—Peter M. Cuomo
*Assistant Examiner*—Anthony D. Barfield
*Attorney, Agent, or Firm*—Thomas, Kayden, Horstemeyer & Risley

[57] ABSTRACT

A seat cover (1) for protecting a motor vehicle seat (14) comprises a front layer (2) extending over and protecting the seating (24) of the seat cushion (23) and the backrest surface (26) of the backrest (25) of the seat. The seat cover (1) has a rear layer (3) connected with the front layer by transverse welding (4, 5) and together with the front layer (2) forming a first pocket (12) for the reception of at least a part of the backrest (25). The front layer (2) on the one hand and the rear layer (3) on the other hand are separate foils (28, 31) connected to each other by a longitudinal welding (6) also. The foil (28) forming the front layer (2) consists of coextruded plastic material having a high friction coefficient on the one surface (30) and a comparatively low friction coefficient on the other surface (29). The foil (28) is located so that the surface (30) having the high friction coefficient is facing the rear layer (3), and the foil (31) forming the rear layer (3) has a low friction coefficient at least on its surface (32) facing the front layer (2).

10 Claims, 2 Drawing Sheets

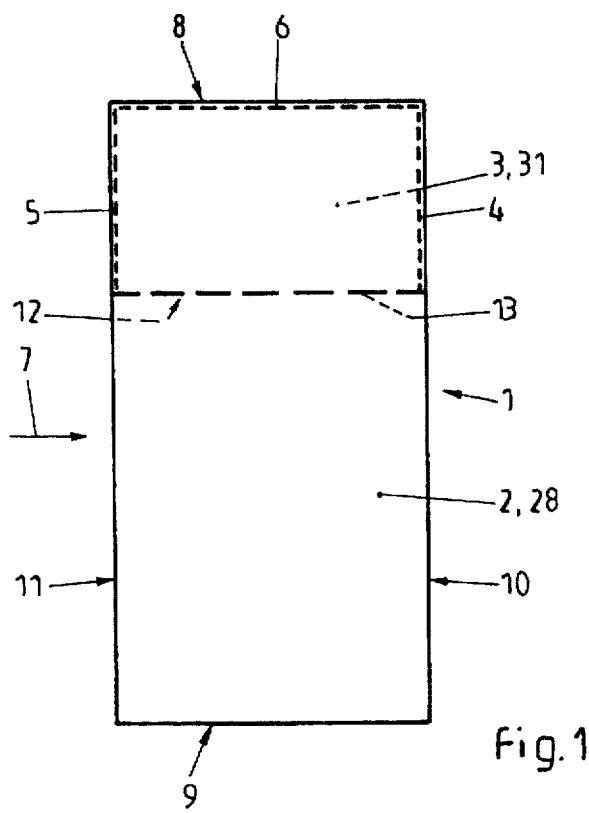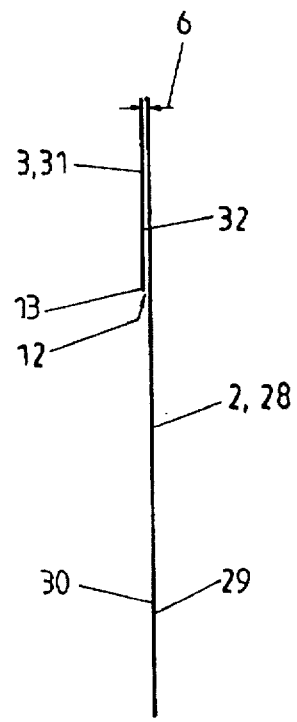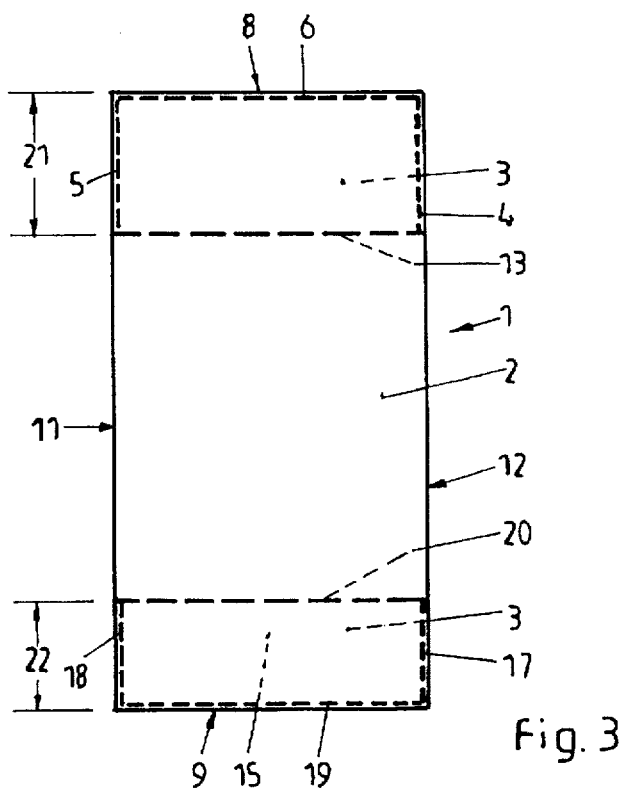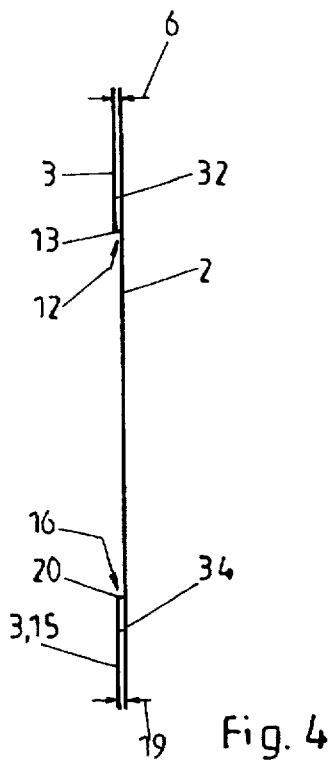
Fig. 1
Fig. 2
Fig. 3
Fig. 4

5,709,431

SEAT COVER FOR PROTECTING A MOTOR VEHICLE SEAT

FIELD OF THE INVENTION

The invention relates to a seat cover for protecting a motor vehicle seat, the seat cover being made from a double-layered piece of plastic film, in particular for the single use in car workshops, comprising a front layer extending over and protecting the seating of the seat cushion and the backrest surface of the backrest of the seat, and a rear layer connected with the front layer by transverse welding and together with the front layer forming a first pocket for the reception of at least a part of the backrest.

BACKGROUND OF THE INVENTION

Seat covers made from plastic foil are slipped or pulled respectively over motor vehicle seats in order to prevent the motor vehicle seat being made dirty by mechanics or other persons. Such seat covers are known from their application in car workshops when vehicles are under going service or repair. During such a repair it happens that the mechanic takes place several times on the vehicle seat being protected with the seat cover. However, it is impossible to take place on such a vehicle seat directly from the front side as it is possible with a normal chair. The motion of taking place is directed from the side into the interior of the vehicle. There is the risk of slipping of the seat cover with respect to the vehicle seat so that parts of the surface of the seat cushion and/or the backrest are no longer protected and during the next taking place these surfaces come into contact with the probably dirty working suit of the mechanic.

A seat cover of the aforementioned type is known from DE-B 16 30 878. During the manufacture, a tube of plastic foil is cut open by means of a longitudinal cut. The two edges thus created are separated from each other and laid, folded flat, on the remaining material of the tube, whereby a double-layered foil is formed, lying flat, from which the seat covers are manufactured by means of transverse weldings, once per seat cover. The joined piece of the tube forms the front layer on the one hand and with its edge portions the rear layer on the other hand. The edge portions of the rear layer together with the front layer being joined therewith form a pocket each, the first pocket of which is destined to enclose the upper region of the backrest of the vehicle seat and the other pocket to enclose the free end of the seat cushion of the vehicle seat, if the seat cover is mounted properly. This known seat cover is made from plastic foil. The plastic foil in form of a monofoil has a low friction coefficient on both surfaces, i.e. the foil is smooth and slippery. The seat covers may be delivered joined together and wound up on a roll having perforations to separate one cover after the other. But it is possible also to separate the seat covers completely during manufacture and to stack them in a cardboard box for delivery. During use, i.e. for the mounting and pulling over a vehicle seat, it is necessary first to open at least the pocket destined to enclose the backrest in order to pull the seat cover over the backrest and a headrest if any. The opening process of the pocket is easy due to the fact of a smooth plastic foil having a low friction coefficient. The pulling over a vehicle seat may be performed without any problems also. Since such a seat cover on its interior surface, i.e. on the surface facing seating of the seat cushion and the backrest surface of the backrest, has a low friction coefficient, the position of the seat cover with respect to the seat is changed during each taking place and each motion of the mechanic on the vehicle seat. This is disadvantageous, because the seat cover slips without control and parts of the seat are no longer surrounded and thus no longer protected by the seat cover.

To counteract the problem of low adhesion between the seat cover being mounted and the vehicle seat it is known from U.S. Pat. No. 4,676,376 to use coextruded plastic foil for the manufacture of seat covers. The foil consists of a double-layered foil being coextruded from two different starting materials, whereby the two layers are joined together during coextrusion. The two starting materials are chosen and applied in a manner so that the one surface of the foil has a high friction coefficient and the other surface has a comparatively low friction coefficient. The foil brings a glue effect on the one surface, while the other surface is smooth and slippery. During manufacture this foil is located with respect to the vehicle seat in a position so that the one gluing surface having the high friction coefficient is destined to face and to contact the seating of the seat cushion and the backrest surface of the backrest, while the smooth surface is directed to the outside and thus forms the contact area to the mechanic. Advantageously such a seat cover has a good adhesion on the vehicle seat in the mounted state, and the smooth surface directed to the outside nearly prevents a slipping of the seat cover during taking place and during motions of the mechanic on the vehicle seat. The essential disadvantage of this known seat cover is the fact that the seat cover creates problems during mounting. This is due to the fact, that in the pocket or in the pockets, if a second pocket is provided to enclose the seat cushion, areas of the foil contact each other, which both have a high friction coefficient and thus glue together. The pocket can be opened only with difficulty and can be pulled over the top of the backrest also only with difficulty. This especially happens with large pockets having a great height. To counteract these problems it seems to be possible to decrease the height of the pocket. But doing this the disadvantage occurs that the proper and sure sit of the seat cover on the vehicle seat is reduced, especially if the vehicle seat is provided with a high extending or positioned head rest. A pocket having a reduced height only encloses the headrest and can slip over the corner areas of the backrest. However, enlarging the height of the pocket makes the opening process of the pocket and the pulling over the headrest and the backrest more difficult. But in this case the sit of the mounted seat cover on the vehicle seat is better.

In addition, the seat covers being manufactured and sold are made from a plastic foil being as thin as possible to reduce the cost and to have a low consumption of plastic material. This happens with respect to environment problems, for a temporary protection of the surface of a vehicle seat by means of a seat cover being used only once should load the natural resources as little as possible. Such seat covers being made from a monofoil have a thickness of about 0.013 mm and are used today in car workshops. But the use of a thin foil increases the problems being connected with the opening process of a pocket. To the contrary, pockets of seat covers being made from a comparatively thicker plastic foil of about 0.020 mm and thicker show decreases problems during opening of the pocket.

SUMMARY OF THE INVENTION

It is the object of the invention to create a seat cover of the aforementioned type, the pocket of which destined to enclose the backrest can be opened easier and can be mounted on a vehicle seat without difficulty and showing a correct sit, while on the other hand the risk of the seat cover to slip with respect to the vehicle seat during taking place and/or motions of a mechanic on the protected seat is very low.

According to the invention, this is achieved in that the front layer on the one hand and the rear layer on the other hand are separate foils connected to each other by a longitudinal welding also, the foil forming the front layer consists of coextruded plastic material having a high friction coefficient on the one surface and a comparatively low friction coefficient on the other surface, the foil is located so that the surface having the high friction coefficient is facing the rear layer, and the foil forming the rear layer has a low friction coefficient at least on its surface facing the front layer.

The invention starts from the idea to fulfil conditions being partly directed against each other. A first separate foil or film is used to form the front layer of the seat cover. A second separate foil or film is used to form the rear layer of the seat cover. Only the foil forming the front layer consists of coextruded material having a high friction coefficient on the one surface destined to enclose and contact the seating and the backrest surface of the vehicle seat, while the other surface destined to contact the mechanic has a low friction coefficient and thus is smooth. As far as the plastic foil forming the rear layer is concerned a material has to be used having at least a low friction coefficient and being smooth on the surface facing the front layer. Thus, a double function results. The pocket can be opened without difficulty, for example by an easy shaking motion of the seat cover. This is the case independent whether the seat cover is packed in a stacked manner or wound up on a roll. On the other hand it is preferably the interior surface of the rear layer, which contacts the backrest during pulling the seat cover over the headrest and the backrest. In a first operational step this makes the mounting of the seat cover more easy, because the interior surface of the pocket formed of the rear layer slips over the seat. The mounting of this part of the seat cover may be performed quickly, surely and without difficulties, whereby at the same time a centring of the seat cover with respect to the longitudinal vertical plane of the vehicle seat occurs. Nevertheless an antiskid sit of the seat cover on the vehicle seat results, as the front layer comes into contact with the backrest surface of the backrest and the seating of the seat cushion. The seat cover gets its proper sit on the vehicle seat. The risk of slipping of the seat cover is avoided practically, even for a number of taking place actions. Even forcing the seat cover transverse to the seat, as it is typical for entering and leaving actions of a vehicle seat, does not result in a slipping motion of the seat cover with respect to the vehicle seat. A further advantage is the fact, that even thin foils may be used to form the front layer and the rear layer without making the opening process of the pocket more difficult. Thin foils having a thickness of about 0.013 mm or 13 μm or even thinner may be used giving a minimum in consumption of material. Each piece of material or foil forming the front layer on the one hand and forming the rear layer on the other hand can be designed separately due to separate extrusion of these foils. Thus, it is possible to increase the gluing effect and the friction coefficient on the one surface of the front layer destined to contact the seating and the backrest surface of the vehicle seat. To the contrary, the inner surface of the rear layer may be manufactured in a very smooth condition, i.e. extruded with an amount of internal lubricant being higher than known in the prior art. Even a very high designed pocket to enclose the backrest, as it is useful for car workshops handling different cars including in different height positioned headrests, does not disturb the easy opening process of the pocket. The invention may be applied with a seat cover having only one pocket to enclose the backrest. But it is possible also to manufacture and handle seat covers having two pockets without problems, the second pocket being adapted to enclose the seat cushion.

The foil forming the rear layer may have a low friction coefficient on its both surfaces. This makes the manufacture of the foil forming the rear layer easier. The folding up of a seat cover being folded together several times for delivery state is easier also. The foil forming the rear layer may be a one-layer foil having the same low friction coefficient on its both surfaces.

It serves for easy recognition of the pocket to be opened and to handle the seat cover during mounting, if the foil forming the rear layer is coloured differently to the foil forming the front layer. The foil forming the front layer may be white, while the foil forming the first pocket may be coloured blue for example. These different colours create an optical stimulus and force the user to pay attention to a proper sit of the seat cover when mounted on the vehicle seat. A third separate foil may be provided, which has at least a low friction coefficient on its surface facing the front layer and being used to form a second pocket to enclose partly the seat cushion and being connected with the front layer by means of longitudinal and transverse welding seams. The third foil may consist of the same material as the second foil forming the first pocket. But it is possible also to use different coloured foils to form the rear layer. These foils may be manufactured to fulfil different conditions. The third separate foil may be coloured different compared with the first foil forming the front layer, thus improving the recognition of the second pocket. If the third separate foil is coloured different to the second foil, the worker can recognize the two pockets each. Thus, the first pocket normally having the greater height may be easily detected having its proper sit on the backrest and not enclosing the seat cushion.

By the use of separate foils being manufactured in different manner to form the front layer an the one hand and the rear layer on the other hand it is possible to increase the gluing effect on the surface having a high friction coefficient without the risk of making the opening process of the pocket more difficult. Thus, the foil forming the front layer on its surface facing the rear layer may have a friction coefficient of about 1.0 or greater than 1.0 and on its surface opposite to the rear layer a friction coefficient of 0.1. The foil forming the rear layer on its surface facing the front layer may have a friction coefficient of about 0.01. A monofoil having a high content of lubricant agent may be used to form the rear layer. There is no limit by the opening process of the pocket or by the pulling over the backrest. Such monofoils may have a friction coefficient of about 0.05 to 0.1. Using coextruded material as in the prior art, in which the pocket is formed by folding the front layer, a friction coefficient results of the surface destined to face the rear layer of about 0.2 to 0.8 and on the other surface a friction coefficient of about 0.1 to 0.2. The mentioned friction coefficients are the ratio between the friction force and the normal acting force (200 g) according to DIN 53 375.

Using special designed foils for the front layer and the rear layer makes it possible to use very thin foils. Thus, the foil forming the front layer and the foil forming the rear layer each may have a thickness of about 13 μ0.013 mm or 13 μm.

BRIEF DESCRIPTION OF THE DRAWINGS

The invention is described in more detail with respect to preferred embodiments. The drawings show:

FIG. 1 is a view to the front layer of a seat cover of a first embodiment,

FIG. 2 is a side view to the seat cover of FIG. 1,

FIG. 3 is a front view to the front layer of a seat cover of a second embodiment, FIG. 4 is a side view to the seat cover of FIG. 3.

DETAILED DESCRIPTION

Figure 5:
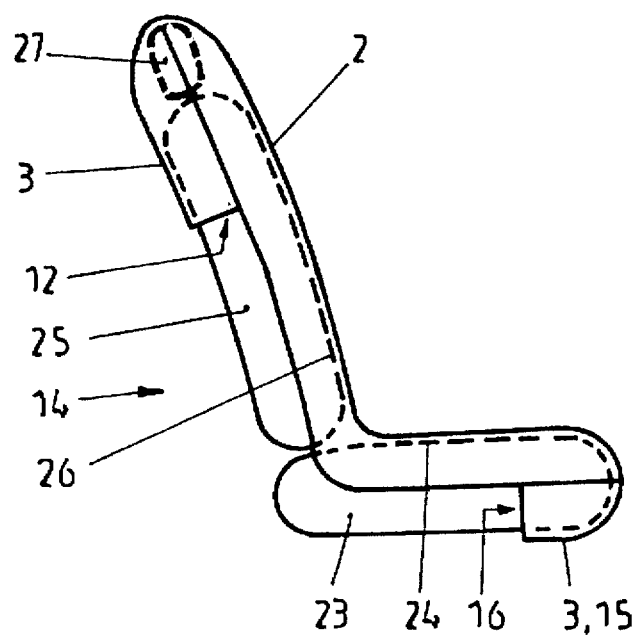
FIG. 5 is a side view to the seat cover of FIG. 3 and 4 mounted on a motor vehicle seat.

In FIG. 1 a view to a seat cover 1 is illustrated. The seat cover is assembled from a front layer 2 and a rear layer 3, both of which consist of separate foils. FIG. 2 shows the mutual overlapping of front layer 2 and rear layer 3. The foil forming the rear layer 3 is connected with the front layer via two transverse welded seams 4 and 5 and one longitudinal welded seam 6. In FIG. 2 the longitudinal welded seam 6 is indicated only by arrows.

The production of the seat cover 1 is performed in known manner by bringing together the two foils forming the front layer and the rear layer. This is done in the running direction according arrow 7. In the running direction according arrow 7 the two foils are provided with free edges 8 and 9. The other edges 10 and 11 extend transverse to the running direction according arrow 7. Thus, the front layer 2 and the rear layer can be connected with each other in a manner so that the connecting regions extend along the free edges of the seat cover. But it is possible also to shift a little the connecting regions, for example into the upper region of the front layer of the pocket 12, i.e. especially into such an area of the pocket 12, which contacts the headrest of the motor vehicle seat. Here, a high coefficient of friction is not needed and by the shifting of the connecting region the winding of the seat covers connected to each other upon a roll is simplified.

If during production the seat covers 1 shall be separated from each other completely a cut or a separation by welding is performed transverse to the running direction according arrow 7, so that the edges 10 and 11 are formed. If production is arranged in a manner so that the seat covers connected to each other have to be wound up on a roll, perforations are formed in a known manner in the area of the edges 10 and 11, making the separation of a seat cover possible one after the other from the roll.

The upper area of the front layer 2 together with the rear layer 3 forms a pocket 12, which is open only at the lower margin 13, while the other three edges are closed by the transverse welded seams 4 and 5 and the longitudinal welded seam 6. This pocket 12 has to be opened prior to the mounting of a seat cover 1 to a motor vehicle seat 14, as illustrated in FIG. 5. Comparatively the new seat cover makes the opening of the pocket 12 and the mounting of it over the backrest of the motor vehicle seat easier. This work unloved by the worker thus is made much easier. A further advantage results from the fact that a mounted seat cover has a fix, secure and unalterable position on a motor vehicle seat, i.e. the desired protective effect.

In FIGS. 3 and 4 a further embodiment of a seat cover 1 is illustrated, in which a front layer 2 and a rear layer 3 are provided also. These two foils here form also a pocket 12, which is assigned to the backrest of the motor vehicle seat 14. There additionally is provided a second foil 15 in the lower area, which completes the rear layer 3. This foil 15 together with the lower portion of the front layer 2 forms a second pocket 16. The pocket 16 is closed by two transverse welded seams 17 and 18 and a longitudinal welded seam 19 and is opened only along its upper margin 20. The height 21 of the pocket 12 is greater and longer respectively than the height 22 of the second pocket 16. Especially the height 21 of the pocket 12 may be twice the height of the pocket 16 without disturbing the easy opening possibility of the pocket 12. The pockets 12 and 16 may have the same height also.

In FIG. 5 a motor vehicle seat 14 is illustrated schematically in a side view. The motor vehicle seat 14 is provided in known manner with a seat cushion 23 having a seating 24 and a backrest 25 having a backrest surface 26. A headrest 27 is arranged on the top end of the backrest 25.

Figure 6:
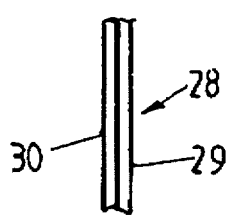
FIG. 6 is a side view to a cut through the foil of the front layer in enlarged scale.

A foil 28 forming the front layer 2 serves for the production of the seat covers 1 according FIGS. 1 to 4. The foil 28 is shown in greater detail in FIG. 6. The foil 28 consists of coextruded plastic material, at which two films are connected to each other as to be seen. The one film has a surface 29 having a low friction coefficient, while the other film has a surface 30 having a high friction coefficient. The foil may be coextruded from three (or more) films, whereby another film is positioned between the two films illustrated. This medium film can serve to improve the ultimate tensile strength. In all cases the foil 28 is located in a manner, as to be seen from FIG. 2, so that the surface 30 having the high friction coefficient is facing the rear layer 3. The same is in the embodiments of FIGS. 3 and 4.

Figure 7:
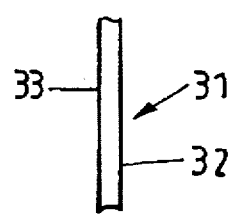
FIG. 7 is a side view to a cut through the foil of the rear layer, also in enlarged scale.

FIG. 7 illustrates a foil 31 used for the rear layer 3. The foil 31 has a surface 32 having a low friction coefficient. The other surface 33 may have a low friction coefficient also.

Both surfaces 32 and 33 of a monofoil. i.e. a one layer foil, may have the same slipperiness. The foil 31 is arranged in a manner so that the smooth surface 32 is facing the front layer 2, as illustrated in FIG. 2. Thus, in the pocket 12 and in the pocket 16 foils are in contact to each other, the one surface of which has a low friction coefficient and the other has a high friction coefficient. This is the reason for the fact that the pockets 12 and 16 may be opened easily, and this despite of the use of a foil 28 having a higher friction coefficient than known in the prior art. The foils 15 and 31 can consist of the same material.

It is useful to colour the different foils 28, 32, 15 in different manner. The foil 28 may be white or translucent, while the foil 31 may be coloured blue for example. The foil 15 may have a grey colour. In this case it is easy to recognize which one is the pocket 12, which is allocated to the upper region of the backrest 25 and the headrest 27.

The production of the seat covers 1 is performed in a manner so that endless foils 28 and 31 are guided one above the other in the direction of arrow 7 and thereby reaching a relative position as illustrated in FIG. 1. Along the edge 8 the longitudinal welded seam 6 is done and then the transverse welded seams 4 and 5, so that the foils 28 and 31 are connected to each other forming the pocket 12. Along the edges 10 and 11 perforations can be formed if the seat covers 1 hanging together have to be wound up on a roll. If the seat covers have to be delivered in a stacked manner a separating or cutting of the individual seat covers 1 occurs along the edges 10 and 11 prior to a stacking motion.

In the embodiment of FIGS. 3 and 4 the foil 15 is used in addition. This foil is shaped and arranged in the same manner as the foil 31. The foil 15 has a surface 34 having a low friction coefficient also.

It will be understood by those skilled in the art that variations and modifications of the disclosed embodiments of the invention can be made without departing from the spirit and scope of the invention as set forth in the following claims.

LIST OF REFERENCE NUMERALS

| | | | |
|---|---|---|---|
| 1 | seat cover | 11 | edge |
| 2 | front layer | 12 | pocket |
| 3 | rear layer | 13 | lower margin |
| 4 | transverse welded seam | 14 | motor vehicle seat |
| 5 | transverse welded seam | 15 | foil |
| 6 | longitudinal welded seam | 16 | pocket |
| 7 | arrow | 17 | transverse welded seam |
| 8 | edge | 18 | transverse welded seam |
| 9 | edge | 19 | longitudinal welded seam |
| 10 | edge | 20 | upper margin |
| 21 | height | 31 | foil |
| 22 | height | 32 | surface |
| 23 | seat cushion | 33 | surface |
| 24 | seating | 34 | surface |
| 25 | backrest | | |
| 26 | backrest surface | | |
| 27 | headrest | | |
| 28 | foil | | |
| 29 | surface | | |
| 30 | surface | | |

I claim:

1. For use on a motor vehicle seat having a seat cushion and backrest extending upward from the seat cushion, a seat cover for single use in car workshops and for protecting the motor vehicle seat, the seat cover being made from a double-layered piece of plastic film the seat cover comprising:

a front film having an outside surface, an inside surface, a top edge and longitudinal edges, the front film adapted to extend and protect a top portion of the seat cushion and a portion of the backrest;

a rear film comprising a separate piece from the front film, the rear film having a top edge, longitudinal edges, an inside surface and an outside surface, the rear film top edge connected with the front film top edge by a transverse welding and portions of the longitudinal edges of the front film and the rear film are connected to each other by a longitudinal welding to form a first pocket for the reception of at least a part of the backrest;

wherein the front film consists of coextruded plastic material having a high friction coefficient on the front film inside surface and a comparatively low friction coefficient on the front film outside surface, wherein the front film inside surface is facing the rear film inside surface; and wherein at least a portion of the rear film inside surface has a comparatively low friction coefficient with respect to the front film outside surface.

2. The seat cover of claim 1, wherein the rear film inside and outside surfaces have a low friction coefficient with respect to the front film outside surface.

3. The seat cover of claim 1, wherein the front film consists of a three-layered coextruded plastic material having an intermediate layer sandwiched by first and second outside layers, in which the intermediate film serves to improve the ultimate tensile strength.

4. The seat cover of claim 1, wherein the rear film is colored differently than the front film.

5. The seat cover of claim 1, further comprising:

a third separate film having an inside surface facing the front film inside surface and an outside surface, and wherein the third film inside surface has a low friction coefficient with respect to the front film outside surface, the third film being connected with the front film by longitudinal and transverse weldings to form a second pocket serving to receive at least a portion of the seat cushion.

6. The seat cover of claim 5, wherein the third separate film is colored differently than the front film.

7. The seat cover of claim 5, wherein the third separate film is colored differently than the rear film.

8. The seat cover of claim 1, wherein the front film inside surface facing the rear film has a friction coefficient of about 1.0 and the front film outside surface has a friction coefficient of about 0.1.

9. The seat cover of claim 1, wherein the rear film inside surface has a friction coefficient of about 0.1.

10. The seat cover of claim 1, wherein the front film and the rear film each have a thickness of about 13 μm.

* * * * *